United States Patent Office 2,863,770
Patented Dec. 9, 1958

2,863,770

METHOD OF PRODUCING A FOODSTUFF

Louis Spieser, Zurich, Switzerland, assignor to Nibbit Products Association Ltd., Zurich, Switzerland No Drawing. Application December 5, 1955
Serial No. 550,862

Claims priority, application Switzerland
December 22, 1954

8 Claims. (Cl. 99—1)

The present invention relates to a process for producing a fried, crisp foodstuff from starch-containing flour, in which a dry mainly starch-containing powder of tubers is mixed with other ingredients, pressed to coherent piecelets and fried.

Such a process is described in my previous U. S. Patent No. 2,665,208, in which the dry powder defined above is mixed with such an amount of stewed starch-containing tubers without addition of water, that the water content of the mixture is under 35%, the loose mixture being pressed into coherent piecelets having a water content of approximately 11% and the piecelets fried in hot oil. During the frying process the described piecelets increase in volume to at least twice their original volume and turn to a crisp, easily digestible product. For the stewed starch-containing tubers stewed potatoes are preferably used.

A disadvantage of this process is that the quality of the end product depends on the time of storage of the potatoes used. Potatoes which have been stored for a long time usually do not give such a good result. A product of high quality can therefore only be produced with this process by using freshly harvested potatoes.

I have found that this disadvantage can be overcome by using as base material instead of a mixture containing stewed potatoes, a not too large-grained starch-containing powder, mixing this powder with such an amount of water, that the water content is between 30 and 40%, pressing coherent piecelets of the resulting mass in an extrusion press operating at a pressure of at least 6 atm., drying these pressed band-shaped piecelets to a water content of 6–10% (evaluated by a normal drying method), cutting the bands into piecelets and finally frying these piecelets in hot oil.

The starch-containing powder described above can be made of dried and milled edible tubers which have previously been prestewed or cooked in another way as e. g. potato-powder. The potato-powder can be replaced up to 50% by other products containing mainly swelled and subsequently dried starch-flour. Furthermore a small admixture of unswelled starch-flour up to an amount of 15% is possible. The grain size of the potato-power is of great importance, as a too large-grained product cannot be extruded without using extremely high pressures. A good product can be pressed by an extrusion press operating at a pressure of 6 atm. at least into a coherent band showing the desired frying qualities after drying, if the water content is held simultaneously between 30 and 40% and preferably between 32 and 35%.

At the said high extrusion pressure the water will entirely penetrate into the steam swelled and subsequently dried starch-flour and the mass will leave the press as a coherent band having nearly the same water content as the loose mass before being pressed. The water content will still be too high to allow the product to be fried properly and it is therefore necessary to dry it. Preferably a predrying in ordinary air will be used, followed by a final drying with warm air in a drying device. After the drying process the water content should amount to 6–10%, preferably to 8–9% measured by the following normal drying method:

The product which has hardened by drying, is milled to a grain size passing through a 50 mesh B. S. S. screen, and after drying for 3 hours in a drying closet at 102° C. the loss of weight of the product is determined. After another 2 hours drying under the same conditions the loss of weight is measured again and if it does not exceed 0.1% the total loss of weight will be considered as the water content of the original product.

Water contents obtained in this way are practically conforming with the water contents obtained by distilling the water off the powder together with a large excess of xylol and determining the water which has run over with the xylol. This method therefore allows the determination of the total content of unbound water in the powder. With a higher or lower water content it is not possible to obtain the desired rise or swelling. It is therefore extremely surprising, that a product of the mentioned low water content can be fried in the described way.

During the frying process the sticklets swell and turn to a crisp, easily digestible product. Frying time is extremely short amounting to 5 to 10 seconds only. The volume increases to more than four times the initial volume during frying and the specific weight of the fried product is not exceeding 0.25 defined as quotient of weight and total volume.

*Example*

75 kg. of potato-powder with a water content of 11% are mixed thoroughly with 25 l. of water. 99% of the potato-powder passes through a 40 mesh screen. Other seasoning products as salt or spices may be added to the mixture.

The mixture is pressed into a band of approximately 3 mm. width and 1 mm. thickness by a jet moulding machine operating at approximately 9 atm.

This band is air dried up to a water content of approximately 18% and subsequently dried with hot air up to a water content of 8% and cut into piecelets. These piecelets are fried during a period of 7 seconds in hot oil of 180–200° C., whereby their volume is increased by approximately five times. The quotient of weight and volume of the fried product amounts to about 0.22.

The starch powder may be any cereal starch powder.

In accordance with one form of the present invention, a starch-containing powder comprising principally swelled and dried starch flour, is mixed with water to provide a powder containing a water-content of between 30 and 40%. Thereafter, the so-produced mixture is extruded under pressure of at least 6 atmospheres to form a coherent band and then the latter is dried to a water-content which is preferably less than 10% and more than 6%.

What I claim is:

1. The method of producing a formed foodstuff from starch-containing flour comprising mixing pre-swelled and dried starch powder derived from an edible tuber with an amount of water such that the resulting mixture contains between about 30% and about 40% of water, extruding the so-produced mixture under a pressure of at least six atmospheres to form a coherent band, and drying the latter to a water-content of less than 10% and more than 6%.

2. The method defined in claim 1 in which up to 15% of the starch-containing material is unswelled starch.

3. The method of producing a formed foodstuff from starch-containing flour comprising mixing an edible pre-swelled and dried potato starch powder with an amount of water such that the resulting mixture contains between about 30% and about 40% of water, extruding the so-produced mixture under a pressure of at least six atmospheres to form a coherent band, and drying the latter to a water-content of less than 10% and more than 6%.

4. The method of producing a fried crisp foodstuff from starch-containing flour comprising mixing an edible starch-containing powder comprising a mixture of an edible pre-swelled and dried potato-starch powder and up to 50% of a different swelled and dried edible starch flour with water in an amount such that the resulting mixture contains between 30% and 40% of water, extruding the resulting mixture under a pressure of at least six atmospheres to form a coherent band, drying the latter to a water-content of less than 10% and more than 6% and then frying the extruded and dried band.

5. The method of producing a fried crisp foodstuff from starch-containing flour comprising mixing pre-swelled and dried starch powder derived from an edible tuber with an amount of water such that the resulting mixture contains between about 30% and about 40% of water, extruding the so-produced mixture under a pressure of at least six atmospheres to form a coherent band, drying the latter to a water-content between the limits of 8% and 9% and then frying the extruded and dried band.

6. The method of producing a fried crisp foodstuff from starch-containing flour comprising mixing pre-swelled and dried starch powder derived from an edible tuber with an amount of water such that the resulting mixture contains between about 30% and about 40% of water, extruding the mixture under a pressure of at least six atmospheres to form a coherent band while the water content of said starch powder penetrates therein, said water being too high to allow the product to be properly fried, drying the resulting coherent band to reduce its water-content below 10% and more than 6%, and then frying the so-dried and extruded band.

7. The method of producing a fried crisp foodstuff from starch-containing flour comprising mixing pre-swelled and dried starch powder derived from an edible tuber with an amount of water such that the resulting mixture contains between about 30% and about 40% of water, extruding the mixture under a pressure of at least six atmospheres to form a coherent band while the water-content of said starch powder penetrates therein, said water being too high to allow the product to be properly fried, subjecting the said coherent band to an initial air-drying step and then to a final air-drying step with warm air to reduce the water-content of the coherent band to below about 10% and more than 6%, and then frying the so-dried and extruded band.

8. The method of producing a formed footstuff from starch-containing flour comprising mixing pre-swelled and dried starch powder derived from an edible tuber with an amount of water such that the resulting mixture contains between about 30% and about 40% of water, extruding the mixture under a pressure of at least six atmospheres to form a coherent band while the water-content of said starch powder penetrates therein, said water being too high to allow the product to be properly fried, and drying the resulting coherent band to reduce its water-content to between the limits of about 8% and 9%.

References Cited in the file of this patent

UNITED STATES PATENTS

| | | |
|---|---|---|
| 2,160,902 | Raymond | June 6, 1939 |
| 2,168,246 | Shepherd | Aug. 1, 1939 |
| 2,295,868 | Schwebke et al. | Sept. 15, 1942 |
| 2,352,670 | Volpertas | July 4, 1944 |
| 2,381,838 | Histon | Aug. 7, 1945 |
| 2,469,995 | Schaul | May 10, 1949 |
| 2,520,891 | Rivoche | Aug. 29, 1950 |
| 2,630,391 | Templeton | Mar. 3, 1953 |
| 2,665,208 | Speiser | Jan. 5, 1954 |

UNITED STATES PATENT OFFICE
Certificate

Patent No. 2,863,770                                                               Patented December 9, 1958

LOUIS SPIESER

Application having been jointly made by Louis Spieser, the inventor named in the above identified patent, Nibbit Products Association Ltd., Zurich, Switzerland, the assignee, and Dirk R. d'Arnaud Gerkens of Jachthuis Liesbos, Breda, The Netherlands, the said Louis Spieser and Dirk R. d'Arnaud Gerkens being assignors to the said Nibbit Products Association Ltd., for the issuance of a certificate under the provisions of Title 35, Section 256 of the United States Code, adding the name of the said Dirk R. d'Arnaud Gerkens to the patent as a joint inventor, and a showing and proof of facts satisfying the requirements of the said section having been submitted, it is this 8th day of November 1960 certified that the name of the said Dirk R. d'Arnaud Gerkens is hereby added to the said patent as a joint inventor with the said Louis Spieser.

[SEAL]

ARTHUR W. CROCKER,
                                                          *First Assistant Commissioner of Patents.*